(12) United States Patent
Patel

(10) Patent No.: US 11,789,934 B2
(45) Date of Patent: Oct. 17, 2023

(54) STRUCTURED OBJECT GENERATION

(71) Applicant: MATCHCRAFT LLC, Santa Monica, CA (US)

(72) Inventor: Dorab R. Patel, Santa Monica, CA (US)

(73) Assignee: Matchcraft LLC, Santa Monica, CA (US)

( * ) Notice: Subject to any disclaimer, the term of this patent is extended or adjusted under 35 U.S.C. 154(b) by 191 days.

(21) Appl. No.: 17/109,826

(22) Filed: Dec. 2, 2020

(65) Prior Publication Data

US 2021/0165779 A1 Jun. 3, 2021

Related U.S. Application Data

(60) Provisional application No. 62/942,882, filed on Dec. 3, 2019.

(51) Int. Cl.
*G06F 16/23* (2019.01)

(52) U.S. Cl.
CPC ................. *G06F 16/2379* (2019.01)

(58) Field of Classification Search
CPC .................................................. G06F 16/2379
See application file for complete search history.

(56) References Cited

U.S. PATENT DOCUMENTS

| | | | |
|---|---|---|---|
| 10,783,564 B1* | 9/2020 | Krishnamurthy | G06Q 30/0242 |
| 2004/0191744 A1* | 9/2004 | Guirguis | G09B 7/02 434/322 |
| 2006/0085470 A1* | 4/2006 | Schmitt | G06F 16/20 707/999.102 |
| 2012/0143715 A1* | 6/2012 | Eshghi | G06Q 30/08 705/26.3 |
| 2017/0177699 A1* | 6/2017 | Chan | G06F 16/84 |
| 2019/0319906 A1* | 10/2019 | Hempton | G06F 16/2365 |
| 2020/0210456 A1* | 7/2020 | Modai | G06F 16/248 |

* cited by examiner

*Primary Examiner* — Tamara T Kyle
*Assistant Examiner* — Lahcen Ennaji
(74) *Attorney, Agent, or Firm* — Dority & Manning, P.A.

(57) ABSTRACT

Structured object generation is disclosed. A source record is accessed. The source record includes a plurality of object data fields. An interpolated source record that has a plurality of object data fields corresponding to the plurality of object data fields of the first source record is generated. A template record is accessed. The template record includes a plurality of template record data fields. Subsequent to generating the interpolated source record, an interpolated template record is generated by, for each template record data field that includes a variable, accessing content of the object data field in the interpolated source record to which the variable refers, and replacing the variable with the content to generate a fixed value for the object data field in the interpolated template record.

20 Claims, 5 Drawing Sheets

FIG. 2

PRE-INTERPOLATION SOURCE RECORD STRUCTURE 24

| | | |
|---|---|---|
| CAMPAIGN | 123 | |
| TEMPLATE | PBOOK1 | |
| MAKE | CHEVY | |
| MODEL | CAMARO {{TRIM}} | |
| TRIM | SS | |
| TYPE | CAR | |
| UNIQUE ID | {{CAMPAIGN}} {{MAKE}} {{MODEL}} | |
| GEO1 | NEAR ME | |
| GEO2 | FLORENCE | |
| DEALER NAME | JENKINS CHEVROLET | |

POST-INTERPOLATION 28

| | |
|---|---|
| CAMPAIGN | 123 |
| TEMPLATE | PBOOK1 |
| MAKE | CHEVY |
| MODEL | CAMARO SS |
| TRIM | SS |
| TYPE | CAR |
| UNIQUE ID | 123 CHEVY CAMARO SS |
| GEO1 | NEAR ME |
| GEO2 | FLORENCE |
| DEALER NAME | JENKINS CHEVROLET |

PRE-INTERPOLATION TEMPLATE RECORD STRUCTURE (PBOOK1) 30

48-1

| CATEGORY | {{MAKE}} {{MODEL}} - BROAD |
|---|---|
| HEADLINE 1 | DRIVE A NEW {{MAKE}} |
| HEADLINE 2 | VISIT {{DEALER-NAME}} VISIT US TODAY |
| DESC 1 | COME TEST DRIVE A NEW {{MAKE}}. VISIT YOUR {{GEO2}} AREA {{MAKE}} DEALER |
| OP | WTE |

48-2

| CATEGORY | {{MAKE}} DEALER - LEASE |
|---|---|
| HEADLINE 1 | {{MAKE}} LEASING DISCOUNTS |
| HEADLINE 2 | CALL FOR A TEST DRIVE |
| DESC 1 | OUR BEST LEASES ON ALL {{MAKE}} MODELS. VISIT {{DEALER-NAME}} IN {{GEO2}} OUR BEST LEASES ON ALL {{MAKE}} MODELS. VISIT {{DEALER-NAME}} |
| OP | BMM |

POST-INTERPOLATION 34-1

| CATEGORY | CHEVY CAMARO SS - BROAD |
|---|---|
| HEADLINE 1 | DRIVE A NEW CHEVY |
| HEADLINE 2 | VISIT JENKINS CHEVROLET VISIT US TODAY |
| DESC 1 | COME TEST DRIVE A NEW CHEVY. VISIT YOUR FLORENCE AREA CHEVY DEALER |
| OP | WTE |

34-2

| CATEGORY | CHEVY DEALER - LEASE |
|---|---|
| HEADLINE 1 | CHEVY LEASING DISCOUNTS |
| HEADLINE 2 | CALL FOR A TEST DRIVE |
| DESC 1 | OUR BEST LEASES ON ALL CHEVY MODELS. VISIT JENKINS CHEVROLET IN FLORENCE OUR BEST LEASES ON ALL CHEVY MODELS. VISIT JENKINS CHEVROLET |
| OP | BMM |

STRUCTURED OBJECT GENERATION

RELATED APPLICATIONS

This application claims the benefit of U.S. Provisional Application No. 62/942,882, filed on Dec. 3, 2019, entitled "STRUCTURED OBJECT GENERATION," the disclosure of which is hereby incorporated herein by reference in its entirety.

BACKGROUND

It is sometimes necessary to generate, based on underlying data sources, a substantial number of information objects that contain data derived from the underlying data sources.

SUMMARY

In one embodiment a method is provided. The method includes accessing a first source record, the first source record comprising a plurality of object data fields, each object data field comprising one of a fixed value, a variable, or a fixed value and a variable, wherein each variable refers to an object data field in the first source record, wherein at least one object data field comprises a variable. The method further includes generating a first interpolated source record that has a plurality of object data fields corresponding to the plurality of object data fields of the first source record by, for each object data field in the first source record that comprises a variable, accessing content of the object data field to which the variable refers, and replacing the variable with the content to generate a fixed value for a corresponding object data field in the first interpolated source record. The method further includes accessing a first template record, the first template record comprising a plurality of template record data fields, each template record data field comprising one of a fixed value, a variable, or a fixed value and a variable, wherein at least one template record data field contains a variable that identifies an object data field of the first interpolated source record. The method further includes, subsequent to generating the first interpolated source record, generating a first interpolated template record by, for each template record data field that comprises a variable, accessing content of an object data field in the first interpolated source record to which the variable refers, and replacing the variable with the content to generate a fixed value for the object data field in the first interpolated template record.

In another embodiment a computing device is provided. The computing device includes a memory and a processor device coupled to the memory. The processor device is configured to access a first source record, the first source record comprising a plurality of object data fields, each object data field comprising one of a fixed value, a variable, or a fixed value and a variable, wherein each variable refers to an object data field in the first source record, wherein at least one object data field comprises a variable. The processor device is further configured to generate a first interpolated source record that has a plurality of object data fields corresponding to the plurality of object data fields of the first source record by, for each object data field in the first source record that comprises a variable, accessing content of the object data field to which the variable refers, and replacing the variable with the content to generate a fixed value for a corresponding object data field in the first interpolated source record. The processor device is further configured to access a first template record, the first template record comprising a plurality of template record data fields, each template record data field comprising one of a fixed value, a variable, or a fixed value and a variable, wherein at least one template record data field contains a variable that identifies an object data field of the first interpolated source record. The processor device is further configured to, subsequent to generating the first interpolated source record, generate a first interpolated template record by, for each template record data field that comprises a variable, accessing content of the object data field in the first interpolated source record to which the variable refers, and replacing the variable with the content to generate a fixed value for an object data field in the first interpolated template record.

In another embodiment non-transitory computer-readable storage medium is provided. The non-transitory computer-readable storage medium includes executable instructions configured to cause a processor device to access a first source record, the first source record comprising a plurality of object data fields, each object data field comprising one of a fixed value, a variable, or a fixed value and a variable, wherein each variable refers to an object data field in the first source record, wherein at least one object data field comprises a variable. The instructions are further configured to cause the processor device to generate a first interpolated source record that has a plurality of object data fields corresponding to the plurality of object data fields of the first source record by, for each object data field in the first source record that comprises a variable, accessing content of the object data field to which the variable refers, and replacing the variable with the content to generate a fixed value for a corresponding object data field in the first interpolated source record. The instructions are further configured to cause the processor device to access a first template record, the first template record comprising a plurality of template record data fields, each template record data field comprising one of a fixed value, a variable, or a fixed value and a variable, wherein at least one template record data field contains a variable that identifies an object data field of the first interpolated source record. The instructions are further configured to cause the processor device to, subsequent to generating the first interpolated source record, generate a first interpolated template record by, for each template record data field that comprises a variable, accessing content of the object data field in the first interpolated source record to which the variable refers, and replacing the variable with the content to generate a fixed value for the object data field in the first interpolated template record.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2 is a block diagram illustrating the generation of interpolated template records according to one embodiment;

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

It is sometimes necessary to generate, based on underlying data sources, a substantial number of information objects that contain data derived from the underlying data sources. The information objects may be printed out, transmitted over a network to various destinations, or utilized in any number of different ways. Where the information objects number in the hundreds or thousands, manual generation by humans using computing devices is time-consuming and fraught with potential human error, such as typographical errors, and the like. It is often desirable to generate a plurality of information objects that relate to a particular subject matter domain, but that differ from one another.

The embodiments disclosed herein implement a highly automated structured object generation system that utilizes underlying data sources to generate any number of structured objects.

Figure 1:
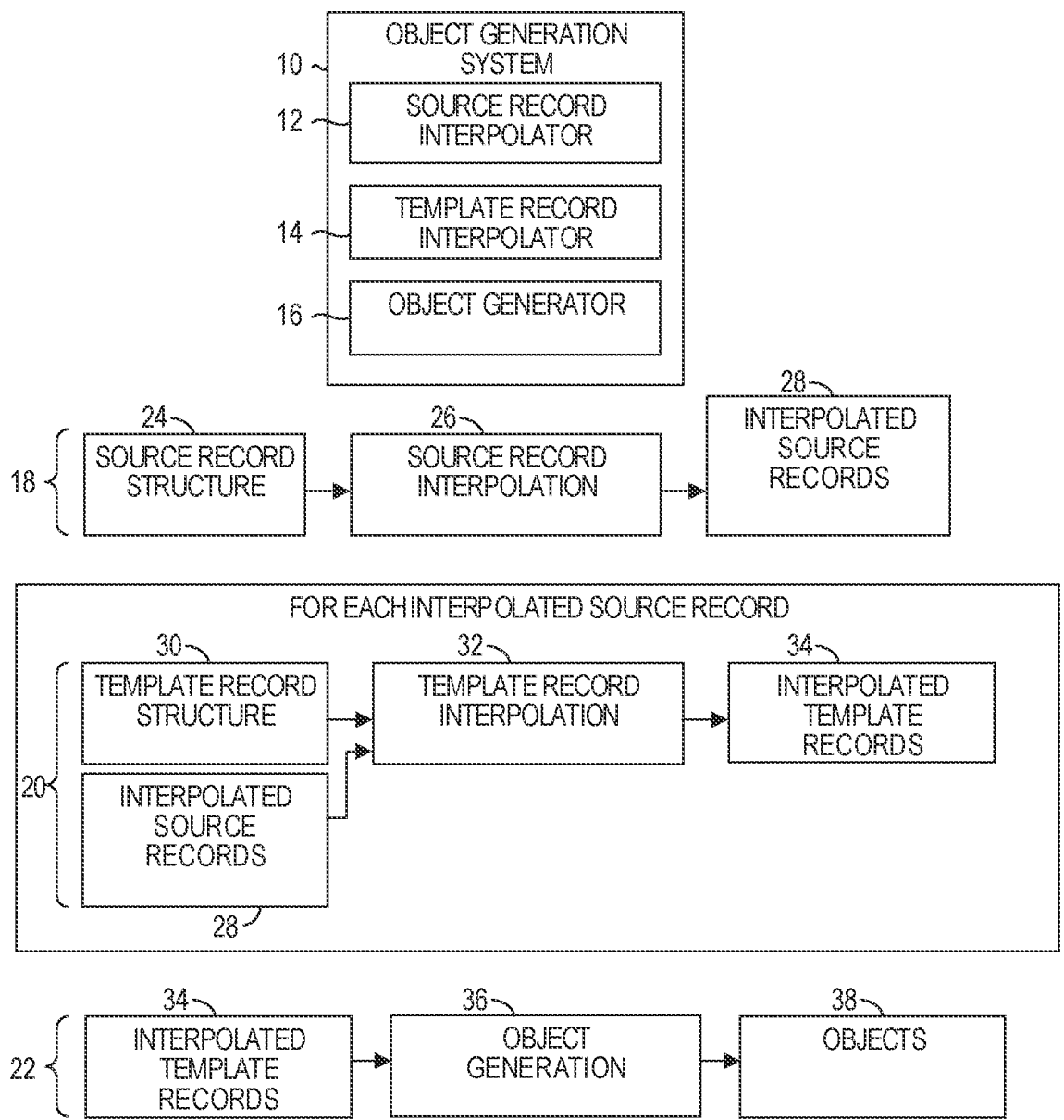
FIG. 1 is a block diagram of an object generation system according to one embodiment.

FIG. 1 is a block diagram of an object generation system 10 according to one embodiment. For purposes of illustration and explanation only, the object generation system 10 is illustrated as comprising three separate components, a source record interpolator 12, a template record interpolator 14, and an object generator 16. However, it will be appreciated that the functionality described herein may be implemented using any number of different components, such as one component or more than three components.

In some embodiments, the object generation system 10 operates in three stages 18, 20 and 22 which may occur in the described sequence. The three stages 18, 20 and 22 will be described generally with regard to FIG. 1, and subsequently, detailed examples of the process described herein with regard to FIG. 1 will be discussed below.

During the first stage 18, the source record interpolator 12 accesses a source record structure 24. The source record structure 24 contains one or more source records. Each source record includes one or more object data fields, each of which may initially have a fixed value, a variable, or a variable and one or more fixed values. A fixed value may comprise a "null" value, which means there is no value in the object data field. A variable in an object data field refers to a different object data field in the same source record, and is interpolated (i.e., replaced with content of that object data field), as described in greater detail below, in order to determine a fixed value for the variable. At a step 26, the source record interpolator 12 performs source record interpolation on each source record and outputs corresponding interpolated source records 28. The interpolated source records 28 comprise the same object data fields as those in the source records, but have no variables because each variable has been replaced with a fixed value based on the content of the object data field in the corresponding source record to which the variable refers.

During a second stage 20, the template record interpolator 14 accesses a template record structure 30 that comprises at least one template record. The process described herein with respect to the second stage 20 is repeated for each template record in the template record structure 30. Each template record comprises one or more template data fields. Each template data field comprises a fixed value, a variable, or a variable and one or more fixed values. Variables in a template data field refer to object data fields in the respective interpolated source record 28. In some embodiments, the respective interpolated source record 28 may identify the particular template record structure 30 that is to be used for the respective interpolated source record 28. Thus, different template record structures 30 may be utilized for different interpolated source records 28.

At a step 32, the template record interpolator 14 cycles through each template record in the template record structure 30 and uses the respective interpolated source record 28 to generate a plurality of interpolated template records 34. In particular, for each template record in the template record structure 30, the template record interpolator 14 utilizes the first interpolated source record 28 to interpolate the data fields in the template record to generate an interpolated template record 34.

During the third stage 22, at a step 36, the object generator 16 accesses the interpolated template records 34 and generates a plurality of objects 38 based on the interpolated template records 34. The object generator 16 may copy or modify data from the interpolated template records 34 to corresponding objects 38 based on one or more processing rules, as will be discussed in greater detail below. If more source records exist, this process is repeated for each such source record.

FIG. 2 is a block diagram illustrating generation of interpolated template records 34 according to one embodiment. Note that while for purposes of illustration the embodiments will be discussed herein in the context of generating structured textual objects associated with the automobile industry, the embodiments are not limited to any particular context, and could be used, by way of non-limiting example, in the real estate industry, retail industry, spare parts industry, or the like.

The source record structure 24 includes one or more source records 40. While for purposes of illustration only a single source record 40 is illustrated, it will be appreciated that in practice the source record structure 24 may include tens, hundreds, or thousands of source records 40. The source record 40 includes a plurality of object data fields 42-1-42-10 (generally, object data fields 42). Again, while for purposes of illustration the source record 40 is illustrated as having ten object data fields 42, in practice a source record 40 may have any number of object data fields 42. Each object data field 42 has a corresponding object data field identifier (ID) 44-1-44-10 (generally, object data field IDs 44). While the object data field IDs 44 are illustrated as having textual names for purposes of illustration, the object data field IDs 44 may comprise any type of ID. Moreover, while for purposes of illustration the object data field IDs 44-1-44-10 are shown in conjunction with the ten object data fields 42, the object data field IDs 44-1-44-10 need not be part of the source record 40, and the object data field IDs 44-1-44-10 need only somehow be correlated to the object data fields 42 through any desired means, such as a correlation structure (not illustrated), by convention, or the like.

Each object data field 42 has a fixed value, a variable, or a fixed value and a variable. A null value is a type of fixed value wherein there is no value in the object data field 42. A fixed value can comprise any non-changing value. A fixed value can be numeric, alphanumeric, or any other value. A variable refers to another object data field in the same source record 40. As an example, the object data fields 42-1-42-3, 42-5-42-6, and 42-8-42-10 have fixed values, the object data field 42-4 has a fixed value ("CAMARO") and a variable ("{{TRIM}}"), and the object data field 42-7 has three variables ("{{CAMPAIGN}}" "WAKED" and "{{MODEL}}") and two fixed values " " (spaces). Note that spaces in any object data field 42 between two variables constitutes a fixed value. The variables may be denoted by some delimiter, in this embodiment, the characters "{{" and "}}"; however it should be understood that a variable may be identified in any desired manner. A variable refers to another object data field 42 in the same source record 40 by referring to the object data field ID 44 of the other object data field 42. In this example, the variable "{{TRIM}}" in the object data field 42-4 refers to the object data field 42-5 (via the object data field ID 44-5). The object data field 42-7 contains three variables "{{CAMPAIGN}}", "{{MAKE}}", and "{{MODEL}}". The three variables in the object data field 42-7 refer to object data fields 42-1, 42-3, and 42-4 respectively. Note that the object data field 42-7 is a unique identifier so that, after the interpolation process discussed below, each interpolated source record 28 will have a corresponding unique ID.

The source record interpolator 12 (FIG. 1) accesses the source record 40 to generate an interpolated source record 28. In particular, for the object data fields 42-1-42-3, 42-5-42-6, and 42-8-42-10, each of which have fixed values, the source record interpolator 12 generates corresponding interpolated object data fields 46-1-46-3, 46-5-46-6, and 46-8-46-10 that have the same corresponding fixed values. For the object data field 42-4, the source record interpolator 12 determines that the object data field 42-4 contains a fixed value and a variable that contains the object data field identifier 44-5 and thus refers to the object data field 42-5. The source record interpolator 12 accesses the corresponding interpolated object data field 46-5, which has a fixed value of "SS", and generates the interpolated object data field 46-4 by combining the values of "CAMARO" and "SS".

For the object data field 42-7, the source record interpolator 12 determines that the object data field 42-7 contains a plurality of variables that contain the object data field IDs 44-1, 44-3 and 44-4, and thus refer to the object data fields 42-1, 42-3 and 42-4, respectively. The source record interpolator 12 accesses the corresponding interpolated object data fields 46-1, 46-3 and 46-4 and generates the interpolated object data field 46-7 by combining the values of the interpolated fixed values from the interpolated object data fields 46-3, 46-4 and 46-6. Note that the variable {{MODEL}} in the object data field 42-7 refers to the object data field 42-4, which itself includes a variable {{TRIM}} which refers to the object data field 42-5. This is an example of nested variables, such that there may be several cycles of interpolation to provide each interpolated object data field 46 in the interpolated source record 28 with a fixed value.

Note that in some embodiments, if an object data field 42 contains a variable and a fixed value, and the variable refers to another data field 42 that has no value (i.e., a null value), then the entire interpolated data field 46 that corresponds to the object data field 42 in the interpolated source record 28 will have no value (i.e., be a null value). Thus, the fixed value identified in the object data field 42 will be discarded.

After the interpolated source record 28 is generated, each of the interpolated object data fields 46 contain only fixed values. The template record interpolator 14 then accesses a template record structure 30. In some embodiments, an interpolated data field 46 in the interpolated source record 28 may identify the particular template record structure 30 to use in conjunction with the particular interpolated source record 28. Thus, different template record structures 30 may be used in conjunction with different interpolated source records 28. In this example, the interpolated object data field 46-2 of the interpolated source record 28 identifies the template record structure 30.

The template record structure 30 includes one or more template records 48-1-48-2. While for purposes of illustration only two template records 48 are illustrated, it will be appreciated that in practice the template record structure 30 may include tens, hundreds, or thousands of template records 48. The template record 48-1 includes a plurality of template record data fields 50-A1-50-A5 (generally, template record data fields 50). While for purposes of illustration the template record 48-1 is illustrated as having five template record data fields 50, in practice a template record 48 may have any number of template record data fields 50. Each template record data field 50 may have a corresponding template record data field ID 52-1-52-5 (generally, template record data field IDs 52). While for purposes of illustration the template record data field IDs 52-1-52-5 are shown in conjunction with the template record data fields 50-A1-50-A5, the template record data field IDs 52-1-52-5 need not be part of the template records 48, and the template record data field IDs 52-1-52-5 need only somehow be correlated to the template record data fields 50-A1-50-A5 through any desired means, such as a correlation structure (not illustrated), by convention, or the like. Each template record data field 50 may have a fixed value, a variable, or a fixed value and a variable. The template record interpolator 14 uses the interpolated source record 28 and the template record 48-1 to generate an interpolated template record 34-1.

Notably, the template record interpolator 14 processes each template record 48-1-48-2 with the interpolated source record 28 to generate a plurality of interpolated template records 34-1-34-2, with one interpolated template record 34 for each template record 48. For example, if, in an example embodiment, the source record structure 24 comprises three source records 40, the source record interpolator 12 generates three interpolated source records 28. Assume for purposes of discussion that each of the three interpolated source records 28 identifies the template record structure 30 as the specific template to use to process the three interpolated source records 28.

Assume that in such example embodiment the template record structure 30 comprises five template records 48. The template record interpolator 14, based on the first interpolated source record 28 and the five template records 48, generates five interpolated template records 34. The template record interpolator 14 then accesses the second interpolated source record 28, and based on the second interpolated source record 28 and the five template records 48, generates another five interpolated template records 34. The template record interpolator 14 then accesses the third interpolated source record 28, and based on the third interpolated source record 28 and the five template records 48, generates another five interpolated template records 34, for a total of fifteen interpolated template records 34.

In the example illustrated in FIG. 2, assume that the template record interpolator 14 first accesses the template record data field 50-A1. The template record interpolator 14 determines that the template record data field 50-A1 contains variables "{{MAKE}}" and "{{MODEL}}" that refer to the interpolated object data fields 46-3 and 46-4 of the interpolated source record 28, respectively, and includes the fixed value "-BROAD". The template record interpolator 14 generates an interpolated template data field 54-A1 that has the value "CHEVY CAMARO SS-BROAD" based on the interpolated object data fields 46-3 and 46-4 and the template record data field 50-A1. In a similar manner, the template record interpolator 14 accesses the template record data fields 50-A2-50-A5, interpolates any variables based on the values of the corresponding interpolated object data fields 46, to generate interpolated template data fields 54-A2-54-A5. Note that a template record data field 50 may comprise multiple fixed values interspersed with variables, as illustrated by template record data field 50-4 for example.

In a similar manner, the template record interpolator 14 accesses the template record 48-2 and generates an interpolated template record 34-2 based on template record data fields 50-B1-50-B5 of the template record 48-2 and on the interpolated source record 28 to generate interpolated template data fields 54-B1-54-B5.

Note that in some embodiments, if a template record data field 50 contains a variable and a fixed value, and the variable refers to an interpolated data field 46 that has no value (i.e., a null value) in the interpolated source record 24, then the entire template record data field 50 in the interpolated template record 34 will have no value (i.e., be a null value). Thus, the fixed value identified in template record data field 50 will be discarded. In some embodiments, where a data field contains an alternative separator, such as the character "A", as discussed in greater detail below, each alternative is treated as a separate data field in that if an alternative contains a variable and a fixed value, and the variable refers to an interpolated data field 46 that has no value (i.e., a null value) in the interpolated source record structure 24, then that alternative will have no value (i.e., be a null value). However, this will not affect the other alternative. If all alternatives are null, then the whole value is null.

Figure 3:
FIG. 3 is a block diagram illustrating the generation of structured objects based on the interpolated template records according to one embodiment.

FIG. 3 is a block diagram illustrating the generation of structured objects based on the interpolated template records 34 according to one embodiment. The object generator 16 contains one or more processing rules 56. The processing rules 56 may comprise configurable parameters, may comprise programming instructions, or may be a combination of programming instructions and configurable parameters. The processing rules 56 determine how structured objects will be generated in response to a particular interpolated template record 34. The processing rules may dictate, for example, that certain interpolated template data fields 54 in the interpolated template records 34 are not included in the structured object.

In this example, the object generator 16 accesses the interpolated template record 34-1 and generates a structured object 38-1 based on the processing rules 56 and the interpolated template record 34-1. The structured object 38-1 includes three data fields 60-1-60-3. In accordance with the processing rules, the data field 60-1 is given the value of the interpolated template data field 54-A2, the data field 60-2 is given the value of the interpolated template data field 54-A3, and the data field 60-3 is given a value based on the interpolated template data field 54-A4. The processing rules in this example indicate that the interpolated template data field 54-A1 is not moved to the structured object 38-1.

In this example, the processing rules 56 identify the character "A" as an alternative separator, and the particular alternative that will be used will be based on a maximum size of the corresponding data field in the structured object 38-1. For example, the interpolated template data field 54-A3 identifies two alternative values, the first being "VISIT JENKINS CHEVROLET" and the second being "VISIT US TODAY". The first alternative is 23 characters long and the second alternative is 14 characters long. If the data field 60-2 has a maximum size of 23 or greater characters, the object generator 16 uses the first alternative as the value of the data field 60-2, and if the data field 60-2 has a size of less than 23 characters, the object generator 16 uses the second alternative as the value of the data field 60-2. The interpolated template data field 54-A5 (i.e., the operator field) has a value of "WTE" which may instruct the object generator 16 to perform certain formatting on the structured object 38-1, or to implement any other desired processing on the interpolated template data fields 54-A1-54-A5 to generate the structured object 38-1. Note that the interpolated template data field 54-A5 is not copied to the structured object 38-1. Note that a data field can have any number of alternative separators, and thus any number of alternatives.

Note that while only one structured object 38-1 is generated based on the interpolated template record 34-1, in other embodiments, based on the processing rules 56, multiple structured objects 38 may be generated from the interpolated template record 34-1.

Similarly, the object generator 16 accesses the interpolated template record 34-2 and generates a structured object 38-2 based on the processing rules 56 and the interpolated template record 34-2. In particular the object generator 16 accesses the interpolated template record 34-2 and generates a structured object 38-2 based on the processing rules 56 and the interpolated template record 34-2. The structured object 38-2 includes three data fields 62-1-62-3. In accordance with the processing rules, the data field 62-1 is given the value of the interpolated template data field 54-B2, the data field 62-2 is given the value of the interpolated template data field 54-B3, and the data field 62-3 is given a value based on the interpolated template data field 54-B4. The processing rules in this example indicate that the interpolated template data field 54-B1 is not moved to the structured object 38-1.

In this example, the interpolated template data field 54-B4 identifies two alternative values, the first being 71 characters long ("OUR BEST LEASES ON ALL CHEVY MODELS VISIT JENKINS CHEVROLET IN FLORENCE") and the second being 60 characters long ("OUR BEST LEASES ON ALL CHEVY MODELS VISIT JENKINS CHEVROLET"). In this example, the data field 62-3 has a maximum size of 80 characters. In accordance with the processing rules, the object generator 16 utilizes the first presented alternative from the interpolated template data field 54-B4 to provide the value of the data field 62-3 in the structured object 38-2.

The interpolated template data field 54-B5 (i.e., the operator field) has a value of "BMM" which may instruct the object generator 16 to perform certain formatting on the structured object 38-1, or to implement any other desired processing on the interpolated template data fields 54-B1-54-B5 to generate the structured object 38-2. Note that the interpolated template data field 54-B5 is not copied to the structured object 38-2. In one embodiment, in response to the presence of the BMM operator, the object generator 16 will extract one or more keywords from a particular interpolated template data field 54 and generate a structured object having a field that contains the "+" character preceding each such keyword. As an example, if the keywords in the particular interpolated template data field 54 are "red dancing shoes", the structured object has a data field of "+red+dancing+shoes".

In another embodiment, if the interpolated template data field 54-B5 (i.e., the operator field) has a value of "exact", the object generator 16 will extract the one or more keywords from the particular interpolated template data field 54 and generate a structured object having a field that contains the keywords bracketed by bracket characters. As an example, if the keywords in the particular interpolated template data field 54 are "red dancing shoes", the structured object has a data field of "[red dancing shoes]".

In another embodiment, if the interpolated template data field 54-B5 (i.e., the operator field) has a value of "negative exact" the object generator 16 will extract the one or more keywords from the particular interpolated template data field 54 and generate a structured object having a field that contains the keywords bracketed by bracket characters preceded by a minus character. As an example, if the keywords in the particular interpolated template data field 54 are "red dancing shoes", the structured object has a data field of "-[red dancing shoes]".

The structured objects 38 may then be subsequently processed, such as read or retrieved by downstream processes, printed, presented on a display device, and/or transmitted to another component for use in a desired application. In some embodiments, the structured objects 38 may comprise content that may be provided to search engines, such as Google or Bing search engines, to be presented on a display device of an individual entering a search query, in conjunction with search results of the search query.

Figure 4:
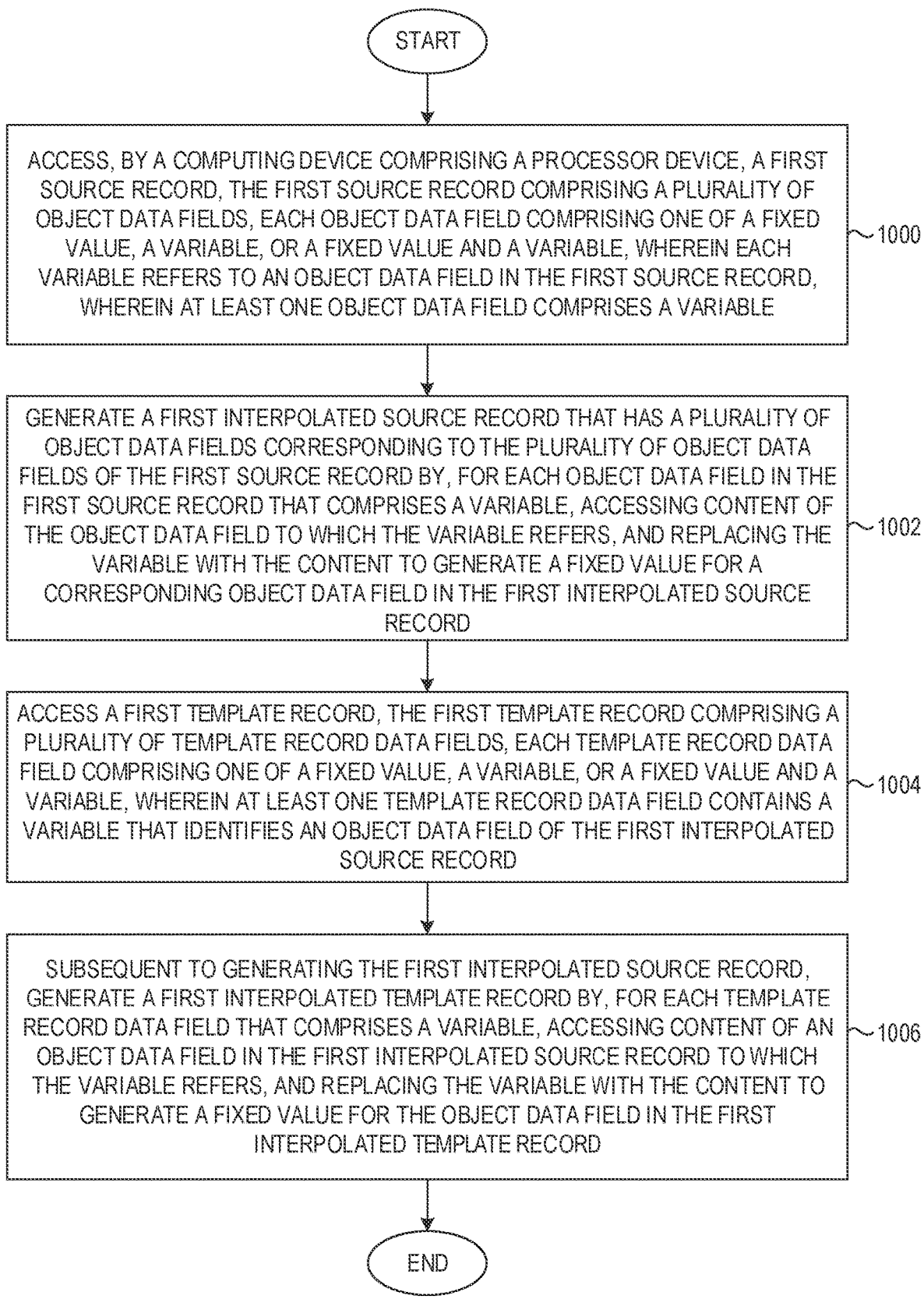
FIG. 4 is a flowchart of a method of structured object generation according to one embodiment.

FIG. 4 is a flowchart of a method for structured object generation according to one embodiment. FIG. 4 will be discussed in conjunction with FIGS. 1 and 2. The object generation system 10 accesses source record 40, the source record 40 comprising the plurality of object data fields 42-1-42-10, each object data field 42 comprising one of a fixed value, a variable, or a fixed value and a variable, wherein each variable refers to an object data field in the source record 40 (FIG. 4, block 1000). The object generation system 10 generates the interpolated source record 28 that has the plurality of interpolated object data fields 46-1-46-10 corresponding to the plurality of object data fields 42-1-42-10 of the source record 40 by, for each object data field 42 that comprises a variable, accessing content of the object data field 42 to which the variable refers, and replacing the variable with the content to generate a fixed value for the corresponding object data field in the interpolated source record 28 (FIG. 4, block 1002).

The object generation system 10 accesses the first template record 48-1, the first template record 48-1 comprising the plurality of template record data fields 50-A1-50-A5, each template record data field 50 comprising one of a fixed value, a variable, or a fixed value and a variable, wherein at least one template record data field 50 contains a variable that identifies an interpolated object data field 46 of the interpolated source record 28 (FIG. 4, block 1004). Subsequent to generating the interpolated source record 28, the object generation system 10 generates the interpolated template record 34-1, by, for each template record data field 50 that comprises a variable, accessing content of the interpolated object data field 46 in the interpolated source record 28 to which the variable refers, and replacing the variable with the content to generate a fixed value for the interpolated template data field 54 in the interpolated template record (FIG. 4, block 1006).

In some embodiments each interpolated source record 28 may include a unique identifier. In the example illustrated in FIG. 2, the interpolated object data field 46-7 comprises a unique ID. All objects (e.g., structured objects 38-1 and 38-2) generated from the interpolated source record 28 are associated with the interpolated source record 28 from which such objects were derived. This association may be maintained in any desired manner, such as pointers in object metadata, physical location of the objects, or the like. In this example, the structured objects 38-1, 38-2 are associated with the interpolated source record 28.

The embodiments disclosed herein implement an idempotence feature, wherein the object generation system 10, based on the unique ID associated with an interpolated source record 28, does not generate duplicate objects in response to processing the same interpolated source record 28 and the same template records 48. For example, if after the process discussed above with regard to FIGS. 2 and 3 to generate the structured objects 38-1-38-2, the object generation system 10 were executed again based on the same source record 40 and the same template records 48-1-48-2, the object generation system 10 determines that an interpolated source record 28 already exists and does not generate duplicative structured objects 38-1-38-2.

Although the object generation system 10 will not generate duplicative objects, the object generation system 10 will update data fields in objects if a previously processed source record 40 and/or template record 48 are re-processed. In particular, based on the unique ID associated with the interpolated source record 28, the object generation system 10 recognizes when a source record 40 for which an interpolated source record 28 exists is being processed again. The object generation system 10 determines whether any object data field 42 of the source record 40 has been modified since the previous processing. If so, the object generation system 10 updates the corresponding interpolated source record 28 to reflect the modified object data field 42. The object generation system 10 also updates any previously generated interpolated template records 34, and any previously generated structured objects 38, if the modified object data field 42 affects the content of any previously generated structured object 38.

As an example, referring again to FIGS. 2 and 3, assume that the object data field 42-10 of the source record 40 is modified from "JENKINS CHEVROLET" to "JANKINS CHEVROLET" to correct a typographical error. The object generation system 10 is executed to process the source record 40. The object generation system 10 interpolates the source record 40 as discussed above, and determines, based on the unique ID object data field 42-7 after interpolation, that the corresponding interpolated source record 28 already exists. The object generation system 10 then determines that a difference exists in the interpolated object data field 46-10 of the interpolated source record 28 and the object data field 42-10 of the source record 40. The object generation system 10 updates the interpolated object data field 46-10 of the interpolated source record 28 to be "JANKINS CHEVROLET".

The object generation system 10 reprocesses the template records 48-1 and 48-2 and determines that the interpolated template records 34-1 and 34-2 already exist. The object generation system 10 updates any data fields in the interpolated template records 34-1 and 34-2 derived from template record data fields 50 that contain variables that refer to interpolated object data field 46-10 of the interpolated source records 28. In this example, the object generation system 10 updates the interpolated template data field 54-A3 in the interpolated template record 34-1 to contain the value "VISIT JANKINS CHEVROLET ^VISIT US TODAY" and updates the interpolated template data field 54-B4 in the interpolated template record 34-2 to contain the value "OUR BEST LEASES ON ALL CHEVY MODELS VISIT JANKINS CHEVROLET IN FLORENCE ^ OUR BEST LEASES ON ALL CHEVY MODELS VISIT JANKINS CHEVROLET".

The object generation system 10 determines that the structured objects 38-1 and 38-2, each derived based on the interpolated source records 28 already exist. Because the data field 60-2 in the structured object 38-1 contains data that is derived from the interpolated template data field 54-A3, the object generation system 10 updates the data field 60-2 in the structured object 38-1 to have a value of "VISIT JANKINS CHEVROLET". Because the data field 62-3 in the structured object 38-2 contains data that is derived from the interpolated template data field 54-B4, the object generation system 10 updates the data field 62-3 in the structured object 38-2 to have a value of "OUR BEST LEASES ON ALL CHEVY MODELS VISIT JANKINS CHEVROLET IN FLORENCE".

Figure 5:
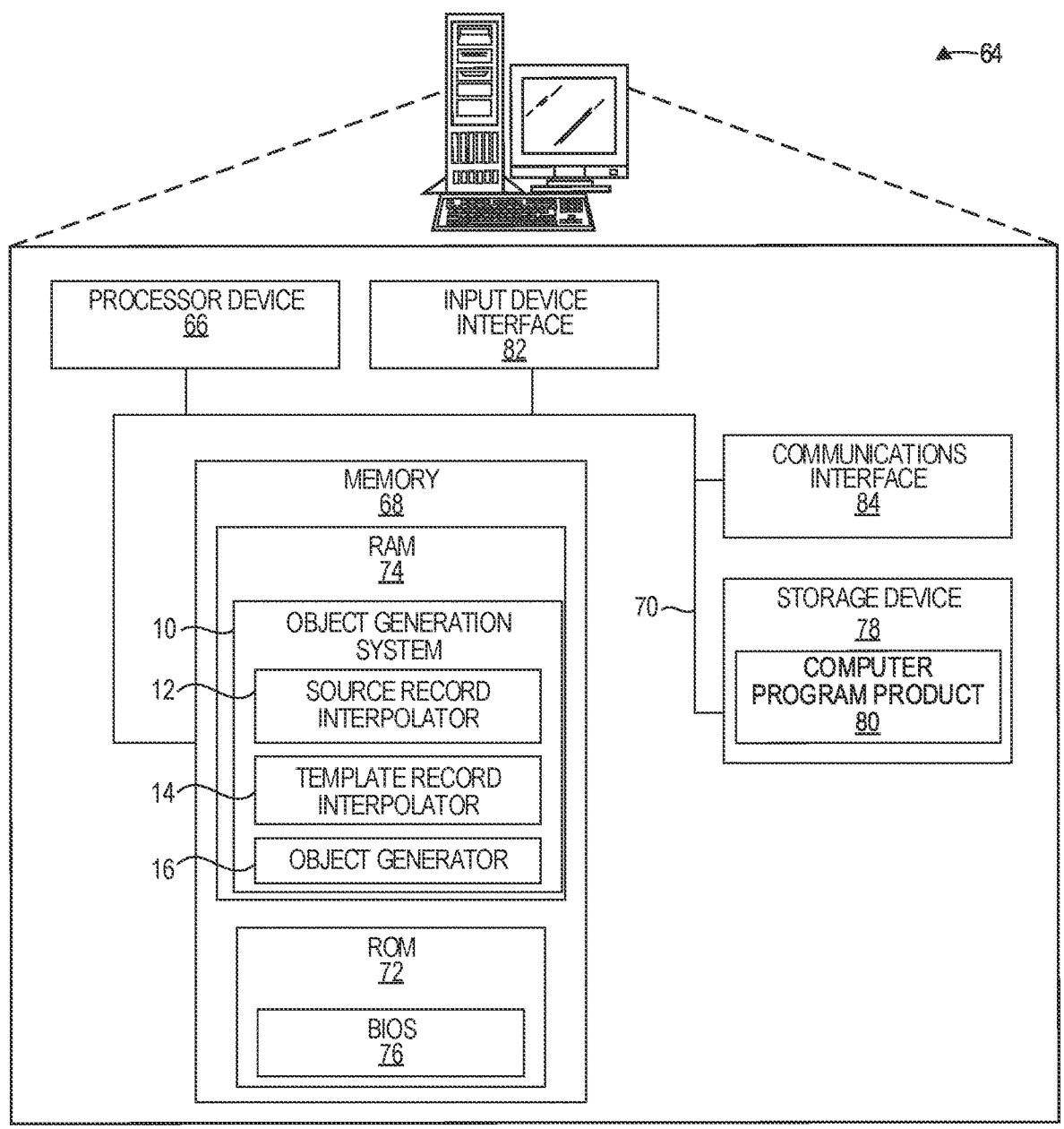
FIG. 5 is a block diagram of a computing device suitable for implementing structured object generation according to one embodiment.

FIG. 5 is a block diagram of a computing device 64 suitable for implementing examples according to one example. The computing device 64 may comprise any computing or electronic device capable of including firmware, hardware, and/or executing software instructions to implement the functionality described herein, such as a computer server, a desktop computing device, a laptop computing device, or the like. The computing device 64 includes a processor device 66, a system memory 68, and a system bus 70. The system bus 70 provides an interface for system components including, but not limited to, the system memory 68 and the processor device 66. The processor device 66 can be any commercially available or proprietary processor.

The system bus 70 may be any of several types of bus structures that may further interconnect to a memory bus (with or without a memory controller), a peripheral bus, and/or a local bus using any of a variety of commercially available bus architectures. The system memory 68 may include non-volatile memory 72 (e.g., read-only memory (ROM), erasable programmable read-only memory (EPROM), electrically erasable programmable read-only memory (EEPROM), etc.), and volatile memory 74 (e.g., random-access memory (RAM)). A basic input/output system (BIOS) 76 may be stored in the non-volatile memory 72 and can include the basic routines that help to transfer information between elements within the computing device 64. The volatile memory 74 may also include a high-speed RAM, such as static RAM, for caching data.

The computing device 64 may further include or be coupled to a non-transitory computer-readable storage medium such as a storage device 78, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 78 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 78 and in the volatile memory, including an operating system and one or more program modules, such as the object generation system 10, which may implement the functionality described herein in whole or in part. Note that because the object generation system 10 is a component of the computing device 64, functionality implemented by the object generation system 10 may be attributed to the computing device 64 generally. Moreover, in examples where the object generation system 10 comprises software instructions that program the processor device 66 to carry out functionality discussed herein, functionality implemented by the object generation system 10 may be attributed herein to the processor device 66.

All or a portion of the examples may be implemented as a computer program product 80 stored on a transitory or non-transitory computer-usable or computer-readable storage medium, such as the storage device 78, which includes complex programming instructions, such as complex computer-readable program code, to cause the processor device 66 to carry out the steps described herein. Thus, the computer-readable program code can comprise software instructions for implementing the functionality of the examples described herein when executed on the processor device 66. The processor device 66, in conjunction with the object generation system 10 in the volatile memory 74, may serve as a controller, or control system, for the computing device 64 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 66 through an input device interface 82 that is coupled to the system bus 70 but can be connected by other interfaces such as a parallel port, an Institute of Electrical and Electronic Engineers (IEEE) 1394 serial port, a Universal Serial Bus (USB) port, an IR interface, and the like. The computing device 64 may also include a communications interface 84, such as an Ethernet transceiver, suitable for communicating with a network as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:

accessing, by a computing device comprising a processor device, a first source record, the first source record comprising a plurality of object data fields, each object data field comprising one of a fixed value, a variable, or a fixed value and a variable, wherein each variable refers to an object data field in the first source record, wherein at least one object data field comprises a variable;

generating a first interpolated source record that has a plurality of object data fields corresponding to the plurality of object data fields of the first source record by, for each object data field that comprises a variable, accessing content of the object data field in the first source record to which the variable refers, and replacing the variable with the content to generate a fixed value for a corresponding object data field in the first interpolated source record;

accessing a first template record, the first template record comprising a plurality of template record data fields, each template record data field comprising one of a fixed value, a variable, or a fixed value and a variable, wherein at least one template record data field contains a variable that identifies an object data field of the first interpolated source record; and subsequent to generating the first interpolated source record, generating a first interpolated template record by, for each template record data field that comprises a variable, accessing content of an object data field in the first interpolated source record to which the variable refers, and replacing the variable with the content to generate a fixed value for the object data field in the first interpolated template record.

2. The method of claim 1 wherein a first object data field in the first interpolated source record comprises a null value, and further comprising:

determining that a first template record data field in the first template record comprises a fixed value and a variable, the variable referring to a first object data field of the first interpolated source record;

determining that the first object data field of the first interpolated source record comprises a null value; and generating the first interpolated template record to have a null value in the first template record data field of the first interpolated template record.

3. The method of claim 1 wherein a first object data field of the first source record identifies the first template record, and wherein accessing the first template record comprises accessing the first template record based on the first object data field.

4. The method of claim 3 further comprising:

accessing a second source record, the second source record comprising the plurality of object data fields;

generating a second interpolated source record by, for each object data field in the second source record comprising a variable, accessing content of the object data field to which the variable refers, and replacing the variable with the content to generate a fixed value for the object data field;

accessing an object data field in the second source record that identifies a second template record that is different from the first template record;

accessing the second template record, the second template record comprising the plurality of template record data fields; and subsequent to generating the second interpolated source record, generating a second interpolated template record by, for each template record data field in the second template record that comprises a variable, accessing content of the object data field in the second interpolated source record to which the variable refers, and replacing the variable with the content to generate a fixed value for the object data field.

5. The method of claim 1 further comprising:

accessing a plurality of template records including the first template record; and for each respective template record of the plurality of template records, generating a corresponding interpolated template record by, for each template record data field that comprises a variable, accessing content of the object data field in the first interpolated source record to which the variable refers, and replacing the variable with the content to generate a fixed value for the object data field in the corresponding interpolated template record.

6. The method of claim 1 further comprising:

accessing a number of source records including the first source record, the number of source records being greater than one, and for each respective source record:

generating a corresponding interpolated source record by, for each object data field in the respective source record that comprises a variable, accessing content of the object data field to which the variable refers, and replacing the variable with the content to generate a fixed value for the object data field;

accessing a number of template records including the first template record, the number of template records being greater than one, and for each respective template record of the plurality of template records:

generating a corresponding interpolated template record by, for each template record data field that comprises a variable, accessing content of the object data field in the corresponding interpolated source record to which the variable refers, and replacing the variable with the content to generate a fixed value for an object data field in the corresponding interpolated template record;

to thereby generate a number of interpolated template records equal to a product of the number of non-null source records and the number of template records.

7. The method of claim 1 further comprising:

generating, based on the first interpolated template record, a structured object by copying content of at least some of the template record data fields to corresponding data fields in the structured object.

8. The method of claim 7 further comprising:

determining that a first data field in the structured object has a maximum size limitation;

accessing a template record data field in the first interpolated template record that corresponds to the first data field;

determining that the template record data field comprises two values and an alternative operator;

determining that a first value of the two values exceeds the maximum size limitation and a second value of the two values does not exceed the maximum size limitation; and inserting the second value of the two values in the first data field of the structured object.

9. The method of claim 7 further comprising:

accessing a template record data field in the first interpolated template record that corresponds to the first data field;

determining that the template record data field comprises a plurality of values and at least one alternative operator;

selecting only one of the plurality of values based on a criterion; and inserting the one of the plurality of values in the first data field of the structured object.

10. The method of claim 1 further comprising generating, based on the first interpolated template record, a structured object.

11. The method of claim 10, wherein an object data field of the first interpolated source record comprises a unique identifier that uniquely identifies the first interpolated source record, and further comprising:
associating the unique identifier with the structured object.

12. The method of claim 11 further comprising:
subsequently processing the first source record;
determining, based on the unique identifier, that the first interpolated source record already exists; and
in response to determining that the first interpolated source record already exists, inhibiting the generation of a second structured object that is derived from the first interpolated template record.

13. The method of claim 1 wherein:
generating the first interpolated source record that has the plurality of object data fields corresponding to the plurality of object data fields of the first source record by iteratively, for each object data field that comprises a variable, accessing content of the object data field to which the variable refers, and replacing the variable with the content to generate the fixed value for the corresponding object data field in the first interpolated source record until the first interpolated source record has no variables.

14. A computing device comprising:
a memory; and
a processor device coupled to the memory, the processor device being configured to:
access a first source record, the first source record comprising a plurality of object data fields, each object data field comprising one of a fixed value, a variable, or a fixed value and a variable, wherein each variable refers to an object data field in the first source record, wherein at least one object data field comprises a variable;
generate a first interpolated source record that has a plurality of object data fields corresponding to the plurality of object data fields of the first source record by, for each object data field in the first source record that comprises a variable, accessing content of the object data field to which the variable refers, and replacing the variable with the content to generate a fixed value for a corresponding object data field in the first interpolated source record;
access a first template record, the first template record comprising a plurality of template record data fields, each template record data field comprising one of a fixed value, a variable, or a fixed value and a variable, wherein at least one template record data field contains a variable that identifies an object data field of the first interpolated source record; and
subsequent to generating the first interpolated source record, generate a first interpolated template record by, for each template record data field that comprises a variable, accessing content of an object data field in the first interpolated source record to which the variable refers, and replacing the variable with the content to generate a fixed value for the object data field in the first interpolated template record.

15. The computing device of claim 14 wherein a first object data field of the first source record identifies the first template record, and wherein to access the first template record, the processor device is further configured to access the first template record based on the first object data field.

16. The computing device of claim 14 wherein the processor device is further configured to:
access a plurality of template records including the first template record, and generate a corresponding plurality of interpolated template records by, for each respective template record of the plurality of template records:
generating a corresponding interpolated template record by, for each template record data field that comprises a variable, accessing content of the object data field in the first interpolated source record to which the variable refers, and replacing the variable with the content to generate a fixed value for the object data field in the corresponding interpolated template record.

17. A non-transitory computer-readable storage medium that includes executable instructions to cause a processor device to:
access a first source record, the first source record comprising a plurality of object data fields, each object data field comprising one of a fixed value, a variable, or a fixed value and a variable, wherein each variable refers to an object data field in the first source record, wherein at least one object data field comprises a variable;
generate a first interpolated source record that has a plurality of object data fields corresponding to the plurality of object data fields of the first source record by, for each object data field in the first source record that comprises a variable, accessing content of the object data field to which the variable refers, and replacing the variable with the content to generate a fixed value for a corresponding object data field in the first interpolated source record;
access a first template record, the first template record comprising a plurality of template record data fields, each template record data field comprising one of a fixed value, a variable, or a fixed value and a variable, wherein at least one template record data field contains a variable that identifies an object data field of the first interpolated source record; and
subsequent to generating the first interpolated source record, generate a first interpolated template record by, for each template record data field that comprises a variable, accessing content of an object data field in the first interpolated source record to which the variable refers, and replacing the variable with the content to generate a fixed value for the object data field in the first interpolated template record.

18. The non-transitory computer-readable storage medium of claim 17 wherein a first object data field of the first source record identifies the first template record, and wherein to access the first template record, the instructions further cause the processor device to access the first template record based on the first object data field.

19. The non-transitory computer-readable storage medium of claim 17 wherein the instructions further cause the processor device to:
access a plurality of template records including the first template record, and generate a corresponding plurality of interpolated template records by, for each respective template record of the plurality of template records:
generate a corresponding interpolated template record by, for each template record data field that comprises a variable, accessing content of the object data field in the first interpolated source record to which the variable refers, and replacing the variable with the content to generate a fixed value for the object data field in the corresponding interpolated template record.

20. The non-transitory computer-readable storage medium of claim 19 wherein the instructions further cause the processor device to:
generate, based on the plurality of interpolated template records, a corresponding plurality of structured objects by, for each interpolated template record, copying content of at least some of the template record data fields to corresponding data fields in the corresponding structured object.

\* \* \* \* \*